United States Patent [19]

Narushima

[11] Patent Number: 5,025,914
[45] Date of Patent: Jun. 25, 1991

[54] FEED-SCREW SUPPORT STRUCTURE

[75] Inventor: Hiroshi Narushima, Konan, Japan

[73] Assignee: Okuma Machinery Works, Ltd., Nagoya, Japan

[21] Appl. No.: 399,169

[22] Filed: Aug. 28, 1989

[30] Foreign Application Priority Data

Aug. 31, 1988 [JP] Japan .................. 63-217564

[51] Int. Cl.[5] .............................. B65G 33/26
[52] U.S. Cl. .................... 198/660; 384/905; 384/278
[58] Field of Search .............. 198/660, 678; 384/9, 384/278, 493, 557, 605, 905

[56] References Cited

U.S. PATENT DOCUMENTS

| 2,915,721 | 12/1959 | Farrand et al. | |
| 3,106,432 | 10/1963 | Opferkuch | 384/278 X |
| 3,582,924 | 5/1969 | Uemura et al. | |
| 3,597,749 | 1/1969 | Uemura et al. | |
| 3,626,397 | 9/1969 | Uemura et al. | |
| 3,639,698 | 2/1972 | Uemura et al. | |
| 3,781,072 | 12/1973 | Nattefort | 384/493 |
| 4,226,485 | 10/1980 | Pruvot | 384/905 X |

FOREIGN PATENT DOCUMENTS

| 367008 | 1/1923 | Fed. Rep. of Germany . | |
| 340997 | 5/1961 | Fed. Rep. of Germany . | |
| 1187457 | 2/1965 | Fed. Rep. of Germany . | |
| 1809229 | 12/1969 | Fed. Rep. of Germany . | |
| 2700173 | 12/1977 | Fed. Rep. of Germany . | |
| 218296 | 2/1985 | Fed. Rep. of Germany . | |
| 3606042 | 9/1986 | Fed. Rep. of Germany . | |
| 242995 | 2/1987 | Fed. Rep. of Germany . | |
| 7004178 | 10/1970 | Netherlands | 198/660 |
| 151012 | 1/1931 | Switzerland . | |

| 1133229 | 11/1968 | United Kingdom . |
| 1409403 | 2/1974 | United Kingdom . |

OTHER PUBLICATIONS

Higgelke, Ziegler, Moderne fertigung, Sep. 1986, pp. 70-71, "Wachstunsbreunse fur Werkzeug Machinen". Neues aus der Tecknik, Nr. 1, 1/1/67, p. 4.

Primary Examiner—Joseph E. Valenza
Assistant Examiner—James R. Bidwell
Attorney, Agent, or Firm—Darby & Darby

[57] ABSTRACT

A feed-screw support structure is adapted to absorb thermal expansion of a feed screw in a machine tool. It comprises a main-body member, a bearing-holder at the one end of the feed screw slidably arranged in the main-body member, a clamping member provided between the bearing-holder member and the main-body member and adapted to fix these members, and a device for operating the clamping member in accordance with factors and matters related to heat generation in the feed-screw. The bearing-holder member being normally held in a stationary condition by the clamping member, the feed screw being allowed to relieve thermal expansion by temporarily releasing the stationary condition when heat generation in the feed screw takes place to a relatively large degree. Alternatively, the structure may comprise a main body member, piezoelectric elements, a bearing case at the one end of the feed screw arranged between the piezoelectric elements and restricted in the axial movement by the bracket of the main-body member, and a device for measuring factors related to heat generation in the feed screw, fine adjustment of the bearing in the axial direction being effected by varying the voltage of the piezoelectric elements.

5 Claims, 12 Drawing Sheets

FEED-SCREW SUPPORT STRUCTURE

BACKGROUND OF THE INVENTION

1. Field of the Invention

This invention relates to a feed-screw support structure adapted to absorb the thermal expansion of the feed screw of a saddle, table or the like in a machine tool, in particular, a machining center.

2. Description of the Related Art

Figure 12:
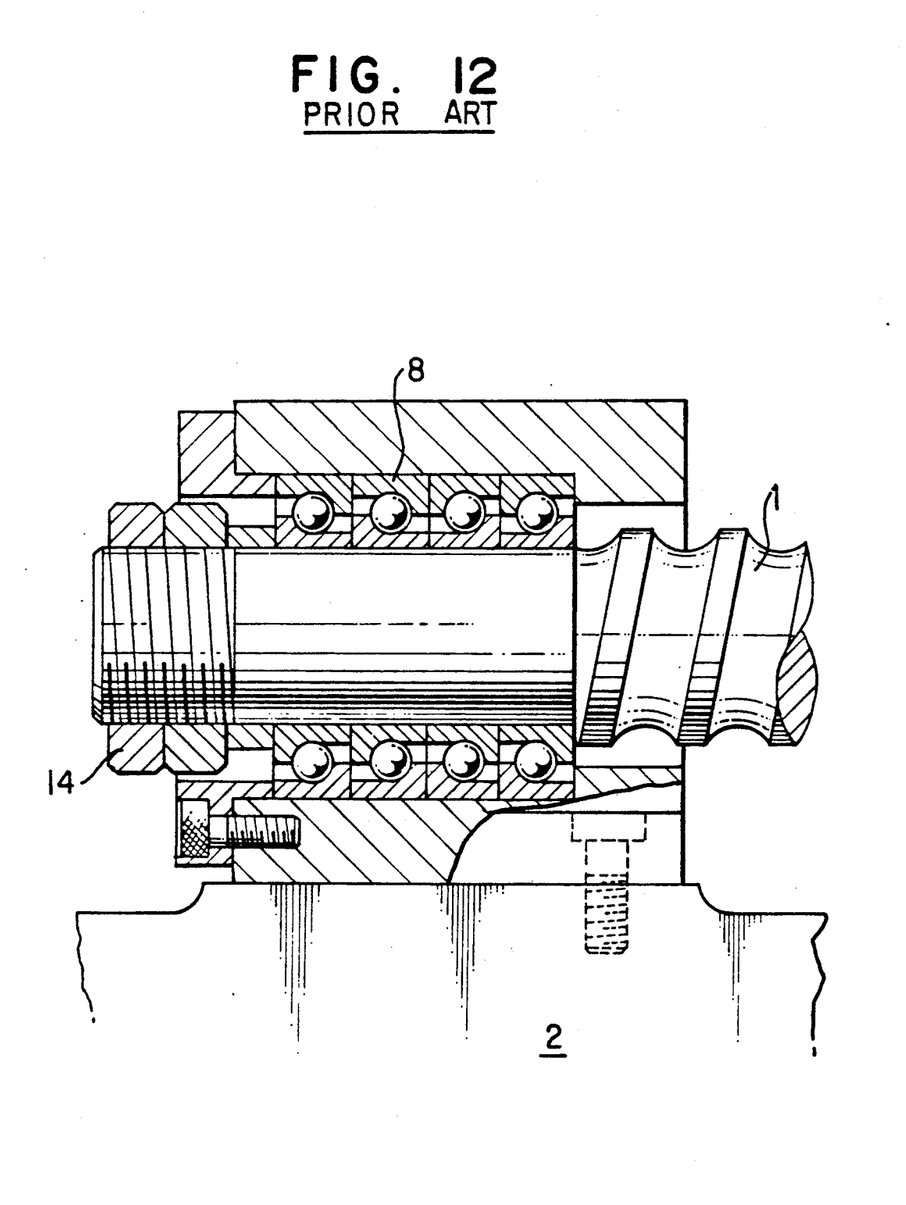
FIG. 12 is a sectional view showing the structure of a conventional bearing section.

In a machine tool which is required to have particularly high dynamic performance, such as a machining center, the feed rigidity must be heightened by supporting both ends of the male screw in such a manner as to preclude any movement in the axial direction, as shown in FIG. 12. Even if a ball screw is employed for the feed screw, the screw will expand with heat if the machine is operated long since the heat generation due to the rolling friction of the ball will cause gradual temperature rise. In view of this, it is the normal practice, in a machine of the type in which both screw ends are fixed, to provide the screw with pre-tension for absorbing elongation. However, in a case where the machine is operated long at high speed, this pre-tension alone cannot absorb the elongation completely, which leads to the generation of an excessive compressive force in the screw, resulting in not only deterioration in accuracy, but also damage to the thrust bearing or an excessively shortened lifetime thereof. To cope with this, various methods of restraining the heat generation in the screw are being practiced. According to one such method, a hollow screw is employed through the central hole of which coolant is allowed to flow. In another method, the heat generation is restrained by means of an oil-mist lubrication system or the like in the ball nut portion.

SUMMARY OF THE INVENTION

The system in which coolant is allowed to pass through the screw center requires a coolant supply device, supply piping, etc., which leads to high cost. Furthermore, it has another problem involving a limit to the diameter and length of the screw The oil-mist lubrication system requires a mist apparatus. Besides, it does not provide a satisfactory cooling effect.

This invention has been contrived with a view to eliminating these problems experienced with the prior art systems. It is accordingly an object of this invention to provide a feed-screw support structure which does not involve any deterioration in the rigidity of the feed system, which necessitates no special cooling means nor any limit to the diameter and length of the screw, and which allows the associated machine to operate continuously a high speed.

In order to achieve this object, this invention provides a feed-screw support structure comprising a main-body member, a bearing-holder member at one end of the feed screw slidably arranged in the above-mentioned main-body member, a clamping member provided between the above-mentioned bearing-holder member and the above-mentioned main-body member and adapted to fix these members, and a means for operating the above-mentioned clamping member in accordance with factors and matters related to heat generation in the feed-screw. When axial feed is not performed, the fixing of the bearing-holder member can be released. In accordance with another aspect of this invention, there is provided a feed-screw support structure comprising a main-body member including a bracket, piezoelectric elements, a bearing case at one end of the feed screw arranged between the above-mentioned piezoelectric elements and restricted in the axial movement by the bracket of the above-mentioned main-body member, and a means for detecting factors related to heat generation in the feed screw. Alternatively, the piezoelectric element may be provided only on the inner side, voltage being constantly applied thereto so as to provide the feed screw with pre-tention.

With the structure in accordance with this invention, a temperature rise to a certain level as a result of heat generation in the feed screw causes the clamping means to release the fixing of the bearing holder, thereby temporarily allowing the elongation of the feed screw. Alternatively, the bearing holder may be normally kept free from the fixing of the clamping means, constantly allowing the elongation of the feed screw. In that case, the bearing holder is fixed only during axial feed. In the structure according to another aspect of the invention, a predetermined voltage is applied to the piezoelectric elements between which the bearing case is placed, any elongation corresponding to heat generation in the screw being absorbed by displacement of the piezoelectric elements.

DETAILED DESCRIPTION OF THE PREFERRED EMBODIMENTS

An embodiment of this invention will now be described with reference to FIG. 1.

The drawing shows the support structure at the tip end of a feed screw 1. In the support structure on the motor side (not shown), it is designed such that a bearing bracket is fixed to a bed 2, as in the structure of FIG. 12 showing a relevant prior art structure.

Figure 1:
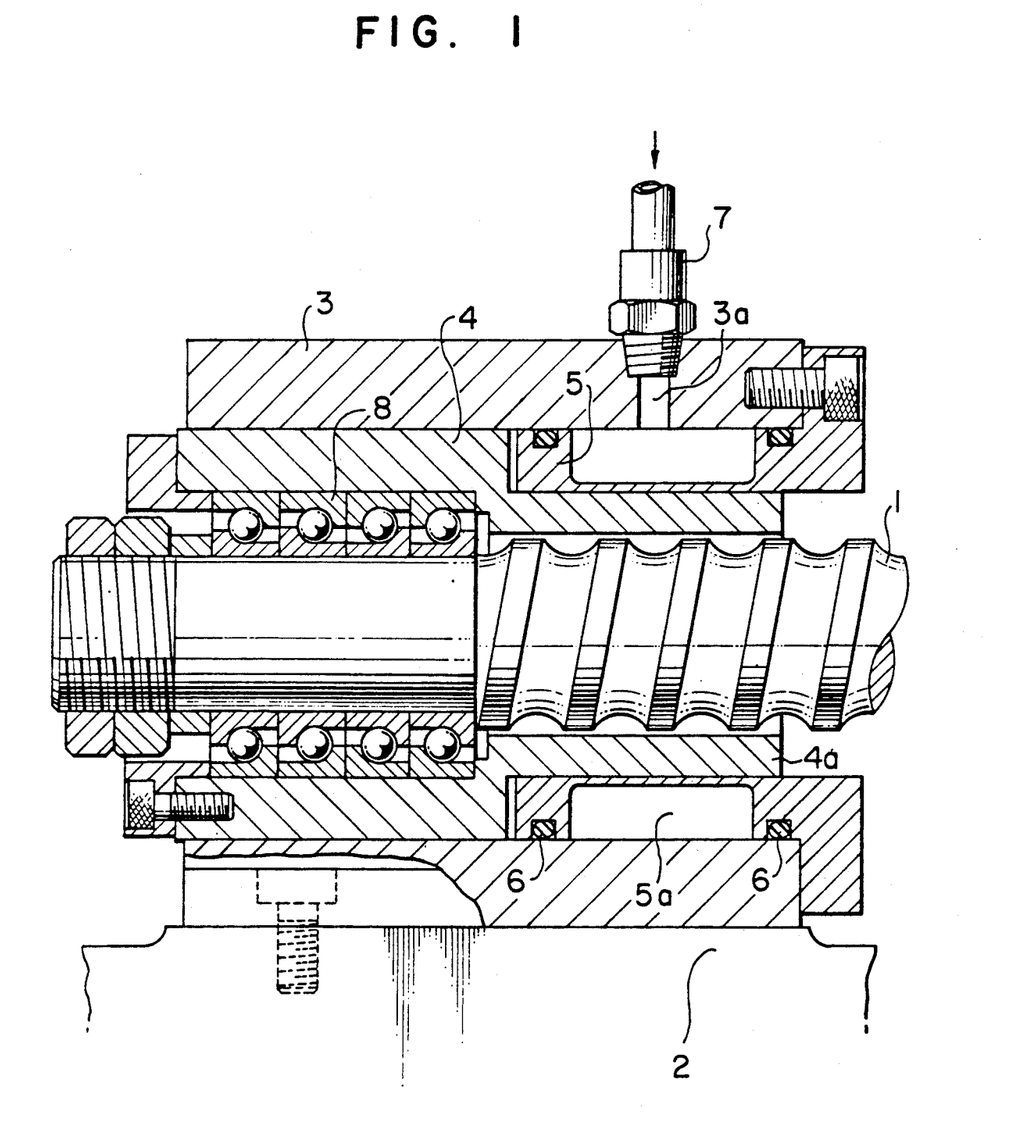
FIG. 1 is a sectional view showing the structure of a bearing section in accordance with a first embodiment of this invention.

Referring to FIG. 1, the structure includes a bed 2 to which a bracket 3 is fixed. A bearing holder 4 is fitted into this bracket 3 in such a manner as to be slidable in the axial direction. Further, a hydraulic-expansion clamp cylinder 5 is arranged between the small-diameter portion 4a of the bearing holder 4 and the bracket 3 in such a manner as to be able to allow sliding movements of the bearing holder 4. The hydraulic-expansion clamp cylinder 5 has a flange portion which is fixed to the bracket 3 by means of bolts. Further, the hydraulic-expansion clamp cylinder 5 has on its outer periphery an annular-recess portion 5a which constitutes an oil receiver. That side of the hydraulic-expansion clamp cylinder 5 which is in contact with the small-diameter section 4a of the bearing holder 4 is formed as a deformable thin-walled portion. The annular-recess portion 5a is sealed on both sides by means of 0-rings 6 serving to prevent oil leakage, high-pressure oil being supplied to the annular-recess portion 5a through the duct 7 connected with an oil path 3a provided in the bracket 3. The bearing holder 4 serves to prevent axial movement of the feed screw while rotatably supporting it through the intermediary of angular bearings 8 which are adapted to receive both thrust and radial loads. It goes without saying that the bearings may also be of the type consisting of one or more thrust bearing and one or more radial bearing which are separately provided.

While in this embodiment the bearing holder of the angular bearing is fixed by means of a hydraulic-expansion clamp cylinder, it is to be understood that the manner of above mentioned clamping and the configuration of the slidable portions with respect to the stationary ones are not restricted to those of this embodiment.

The timing with which the above mentioned hydraulic-expansion clamp cylinder 5 is unclamped may be determined in accordance with anyone of the following methods:

(1) The timing may be determined by a program method which inserts the data in the experiment from which the heat-generating condition was previously ascertained. The process follows the flowchart of FIG. 2.

Figure 2:
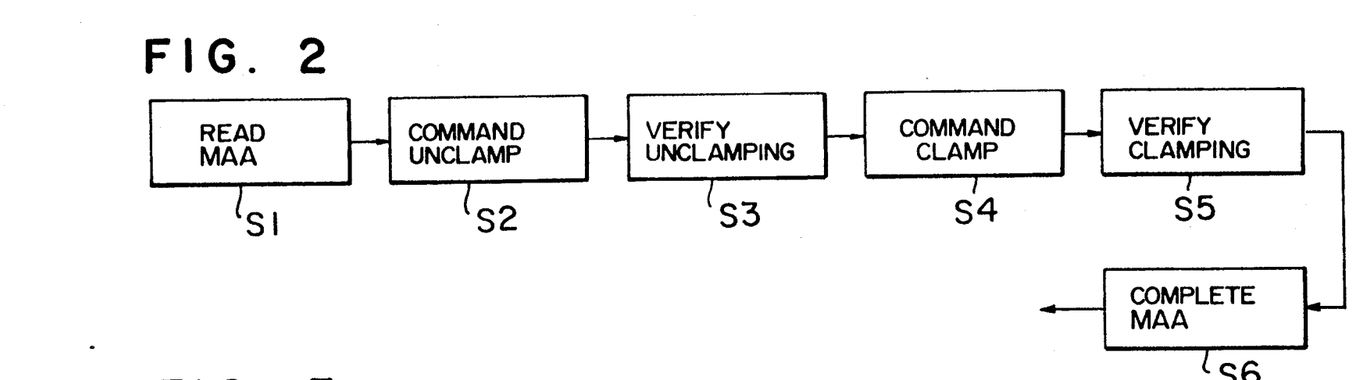
FIG. 2 is a flowchart of the program control of the hydraulic-expansion clamp cylinder used in this structure.

Suppose the M-code number, which is a motion command for making a NC machine work in desired functions, is MAA, for example, MAA is then read in Step S1. In Step S2, an unclamp command is given to the hydraulic-expansion clamp cylinder 5. The high-pressure oil supplied through the duct 7 is then evacuated from the hydraulic-expansion clamp cylinder 5, the deformed body portion of the cylinder being restored to the state before expansion by virtue of the elasticity thereof. At this stage, the bearing holder 4 is displaced by a distance corresponding to the thermal expansion of the feed screw 1, the compressive force of the feed screw 1 being eliminated. In step S3, the unclamp state is verified when the pressure in the duct 7 is determined to be zero. In Step S4, a clamp command is output, and the high-pressure oil is supplied again through the duct 7, causing the inner pressure in the annular-recess portion 5a of the hydraulic-expansion clamp cylinder 5 to increase. As a result, the thin-walled portion is deformed to expand, thereby clamping the bearing holder 4. The clamp state is verified in Step S5 when the pressure in the duct 7 is determined to be high. An "MAA-complete" signal is output in Step S6.

Figure 3:
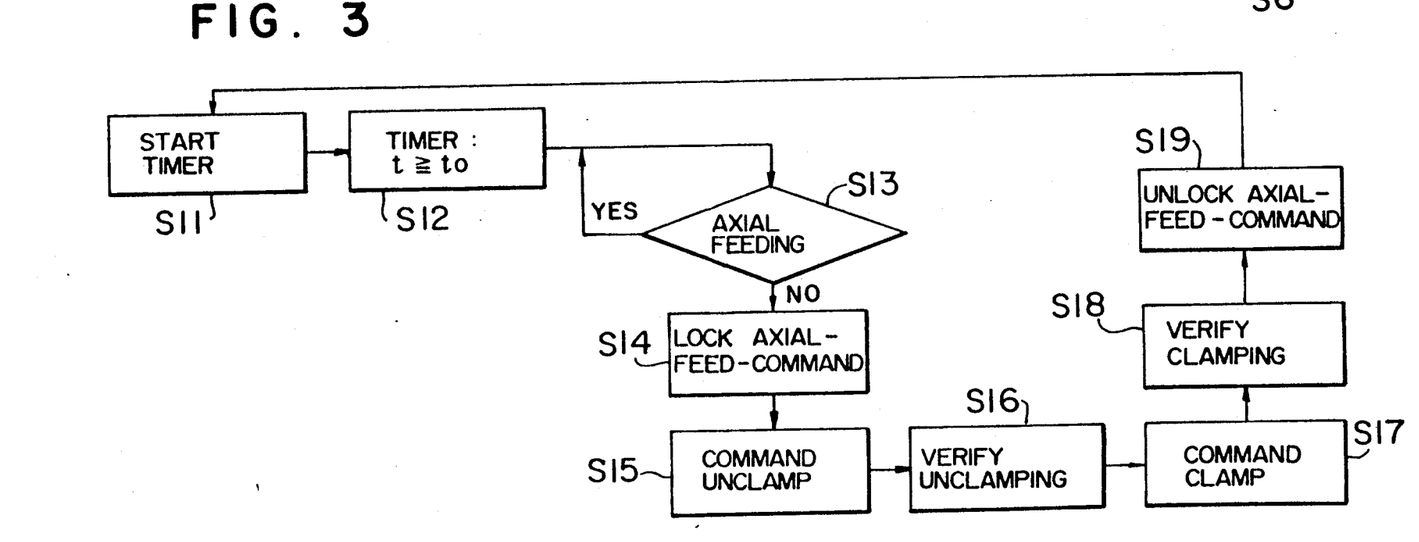
FIG. 3 is a flowchart of the control process for the same in which a timer is used.

(2) The unclamping timing may be decided by a method using a timer. The control process follows the flowchart of FIG. 3. If a cutting operation is performed when unclamping is desired, the operation is temporarily interrupted, or the unclamping is not effected until the operation is completed. The timer is started in S11. When, in Step 12, the condition: $t \geq t_0$ ($t_0$: set time determined through experiment or the like; t: accumulated machine operation time, or preferably, axial-feed-time accumulation) is satisfied, the timer is to operate. In Step S13, a judgment is made as to whether or not axial feed is being effected. The judgment is made for not only the feed screw to be controlled but also the other axial-feed components. If the judgment result is YES, the step is repeated until the result becomes NO. When the judgment result in this step becomes NO, the axial-feed command is locked in Step S14, thereby stopping all the axial feed controls. In Step S15, an unclamp command is output, which causes the high-pressure oil in the duct 7 to be evacuated, thereby reducing the pressure in the duct to zero and restoring the hydraulic-expansion clamp cylinder 5 to the state before expansion. It is determined with certainty, in Step S16, that the pressure in the duct 7 has been reduced to zero. At this stage, the feed screw is allowed to release thermal expansion, the compressive force of the screw being relieved. In Step S17, a clamp command is output, and, in Step S18, the clamp state is verified when the pressure in the duct 7 is determined to be high. In Step S19, the axial-feed-command lock is released, and the process is taken back to step S11 and then the timer is started again.

(3) The unclamping timing can also be determined by a method utilizing the difference between a reference temperature and the measured temperature of the male or female screw. The control process follows the flowchart of FIG. 4.

Figure 4:
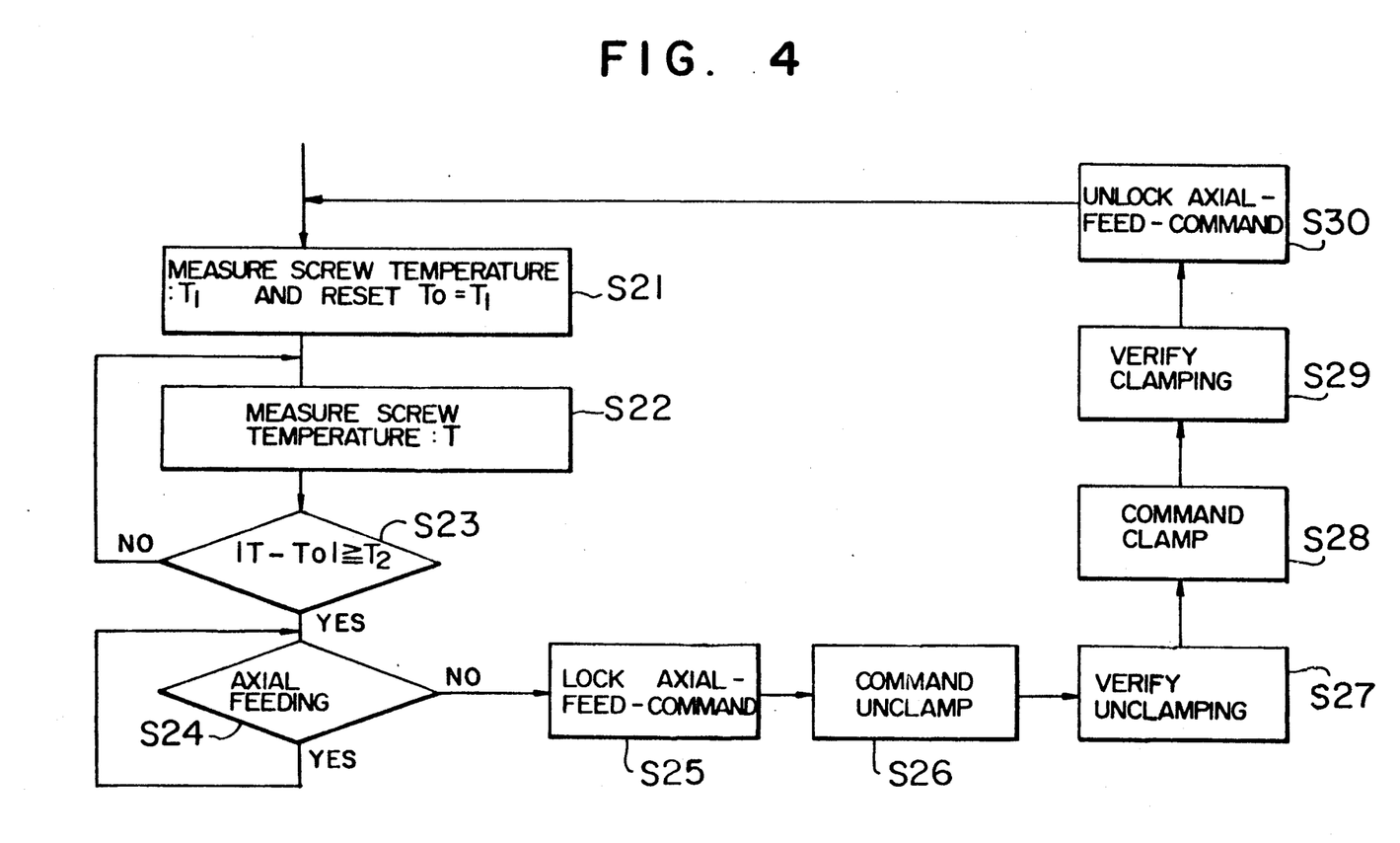
FIG. 4 is a flowchart of the control process for the same in which the screw-section temperature measured is utilized.

The temperature T of the feed screw can be ascertained by extracting the output of a temperature sensor through a slip ring or the like, or it can be detected by means of an infrared sensor. In Step S21, the temperature $T_1$ of the female screw before operation is measured. The temperature $T_1$ measured is established as the reference temperature $T_0$. In Step S22, the temperature T of the female screw is measured again. In Step S23, a judgment is made as to whether or not the difference between the measured temperature T and the reference temperature $T_0$ is either equal to or larger than a set value $T_2$. If the result is NO, the procedure returns to Step S22, where the temperature is measured, the same judgment being repeated until the result becomes YES. When the result is YES, a judgment is made in Step S24 as to whether or not axial feed is performed. If the result is YES, the judgment is repeated until it becomes NO. In Step S25, the axial feed command is locked. In Step S26, an unclamp command is output, which causes the high-pressure oil in the duct 7 to be evacuated, reducing the pressure in the duct 7 to zero. In Step 27, it is determined with certainty that the pressure in the duct 7 has been reduced to zero. The clamping of the hydraulic-expansion clamp cylinder 5 is then released, and the screw is allowed to relieve thermal expansion. In Step S28, a clamp command is output, which causes high-pressure oil to be supplied to the duct 7, thereby causing the hydraulic-expansion clamp cylinder 5 to be deformed to effect clamping. The pressure in the duct 7 is verified in Step S29. In Step S30, the axial-feed command is unlocked, which enables the machine to operate. Afterwards, this flow is repeated, establishing the first measured temperature $T_1$ in each cycles as the next reference temperature $T_0$. Instead of directly utilizing the temperature of the feed screw, it is also possible to indirectly utilize the temperature of the bearing portion or that of the female screw.

Figure 5:
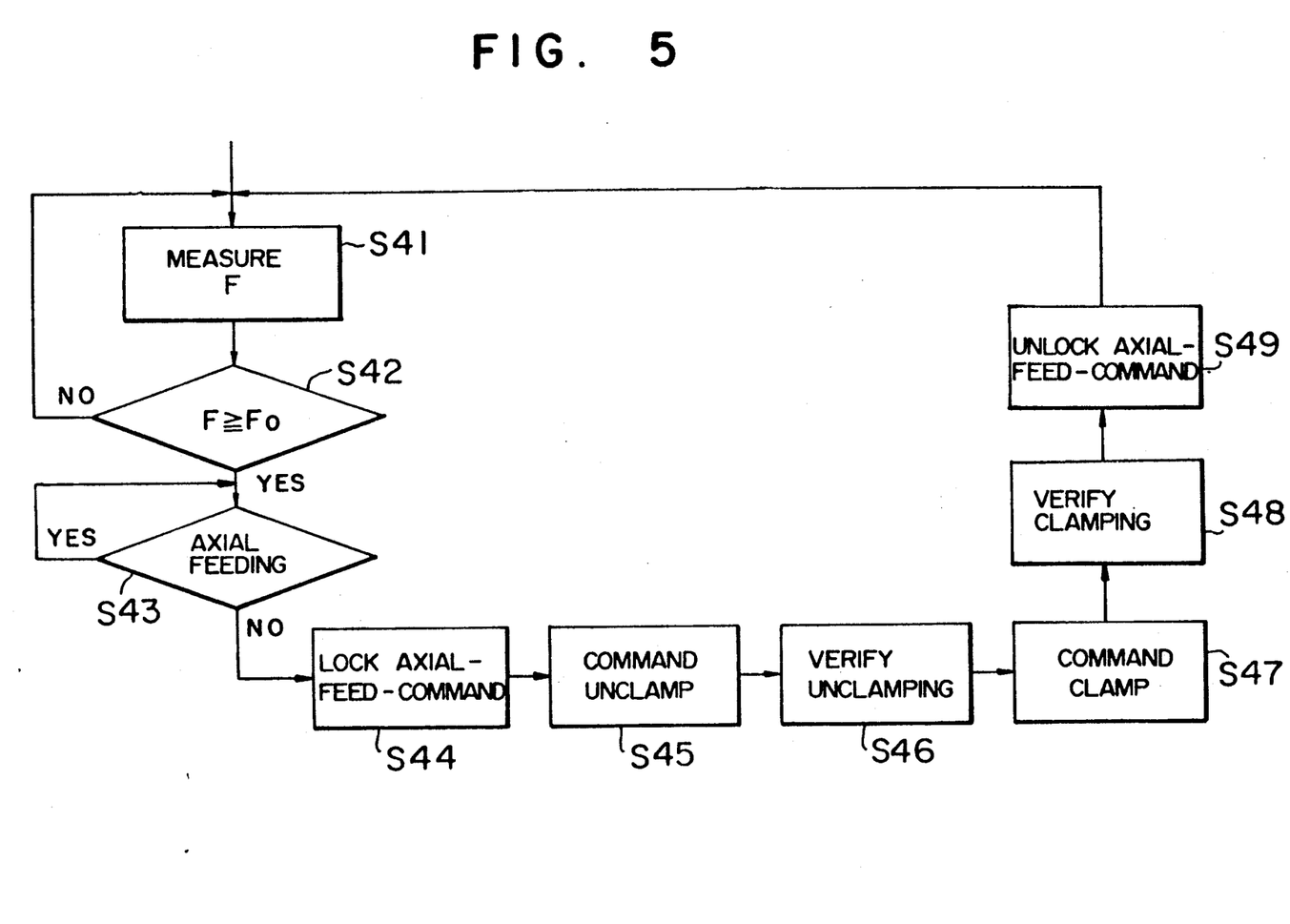
FIG. 5 is a flowchart of the control process for the same in which the compressive force measured in the screw section is utilized.

(4) The unclamping timing may also be determined by a method utilizing the difference between a set value and the detected compressive force acting on the male screw or the bearing. The control process follows the flowchart of FIG. 5. The compressive force can be detected by means of resistance-wire-strain-gauge or piezoelectric elements. In Step S41, the compressive force F is detected. A judgment is made in Step S41 as to whether or not $F-F_0$ (F: detected compressive force; $F_0$ set value). If the judgment result is NO, the step is repeated until it becomes YES. It is determined in Step S43 whether axial feed is performed; if the result is YES, the step is repeated until it becomes NO. In Step S44, the axial-feed command is locked. In Step S45, an unclamp command is output, which causes the high-pressure oil in the duct 7 to be evacuated. It is verified in Step S46 that the pressure in the duct 7 has been reduced to zero. The clamping of the hydraulic-expansion clamp cylinder 5 is then released, and the screw is allowed to relieve thermal expansion. In Step S47, a clamp command is output, which causes high-pressure oil to be supplied to the duct 7, thereby deforming the hydraulic-expansion clamp cylinder 5 to effect clamping. In Step S48, the clamp state is verified when the pressure in the duct 7 is determined to be high. In Step S49, the axial-feed command is unlocked, thereby setting the machine ready for axial feed. Afterwards, this flow is repeated.

Figure 6:
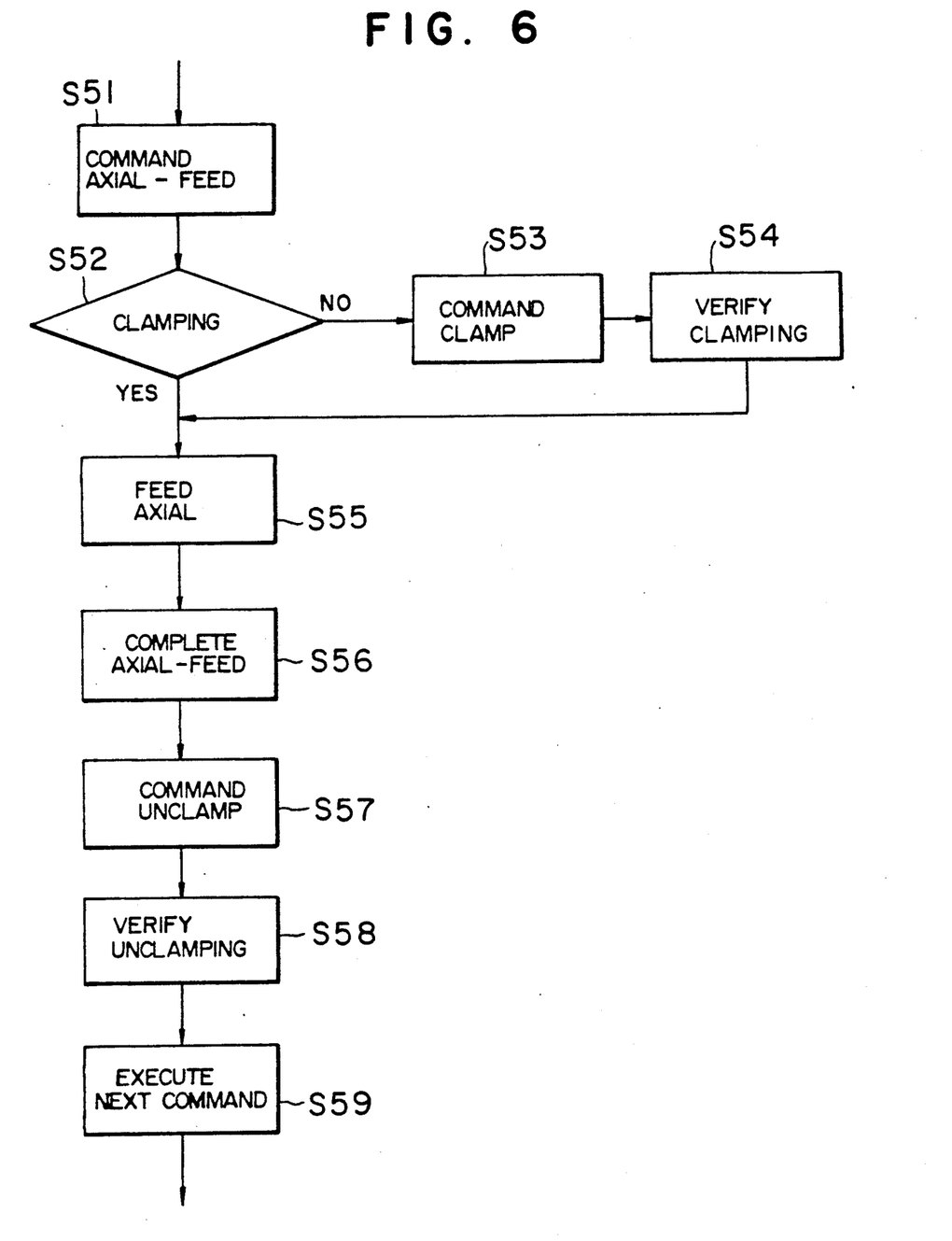
FIG. 6 is a flowchart of the control process for effecting unclamping during axial feed being not performed.

(5) When unclamping is to be effected when a cutting operation is not performed, the flowchart of FIG. 6 is followed. When no axial feed is performed, the unclamp state is constantly maintained. When in Step S51 an axial-feed command is output, it is judged in Step S52 whether clamping is being effective or not. If the result is NO, a clamp command is output in Step S53, and high-pressure oil is supplied to the duct 7, thereby causing the hydraulic-expansion clamp cylinder 5 to be deformed to effect clamping. The clamp state is verified in Step S54 when the pressure in the duct 7 is determined to be high. Then, axial feed is executed in Step S55 as in the case where the result of Step S52 is YES, thus performing a predetermined working, etc. When the working has been completed in Step S56, an "axial-feed complete" command is output. An unclamp command is then output in Step S57, the high-pressure oil in the duct 7 being evacuated and the hydraulic-expansion clamp cylinder 5 restored to the state before deformation. The unclamp state is verified in Step S58 when the pressure in the duct 7 is determined to be zero. The next command is executed in Step S59.

Figure 7:
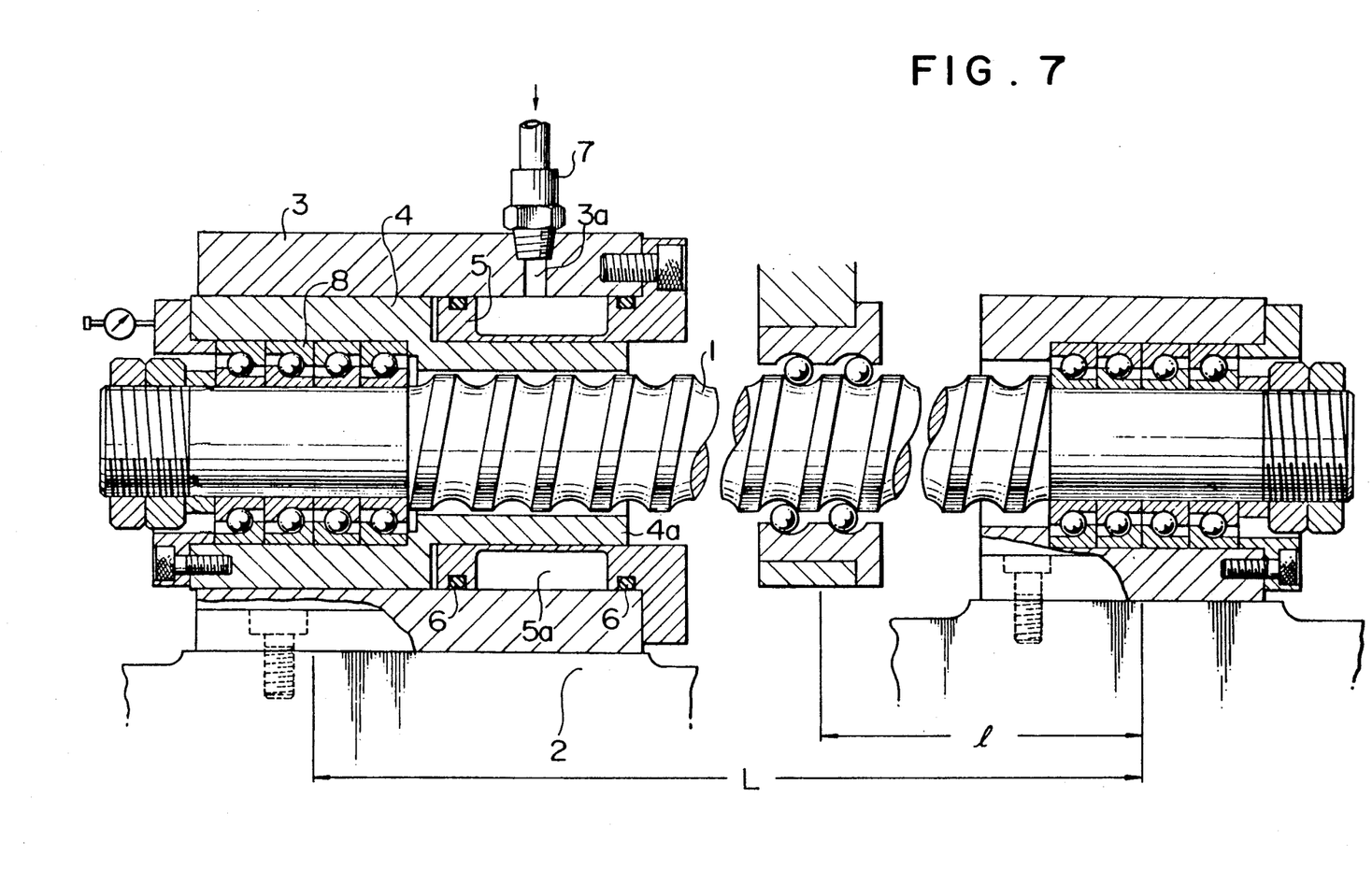
FIG. 7 is a whole sectional view showing the first embodiment according to the invention.

When the position of the feed screw is determined by a means allowing direct absolute measurement, such trade, names as Inductosyn (see U.S. Pat. No. 2,915,721) and Magnescale (e.g., see U.S. Pat. Nos. 3,582,924; 3,597,749; 3,626,397; and 3,639,698), no particular correction has to be conducted for the elongation of the screw due to thermal expansion. However, when the positional detection is conducted on the basis of the turning of the screw, it is necessary to correct any elongation of the screw. The correction is then conducted as follows: as shown in FIG. 7 first, the terminal position of the feed screw is ascertained before operating the machine by a sensor measuring an axial expanding value of the feed screw 1 at an outer end face of a bearing cover mounted on the bearing holder 4. Then, the terminal position of the screw after unclamping is determined, thereby obtaining the displacement placement $\Delta l$ due to the elongation. It is necessary to add the correction amount $d = (l/L) \times \Delta l$ at each position $l$ in the entire length L of the feed screw to the corrected pitch-error value at each position $l$. While in the above examples the verification of the clamp and unclamp states is effected by means of a pressure switch for measuring the pressure in the duct, any other measuring means including a timer will serve the purpose as long as it has an equivalent measuring function.

Figure 8:
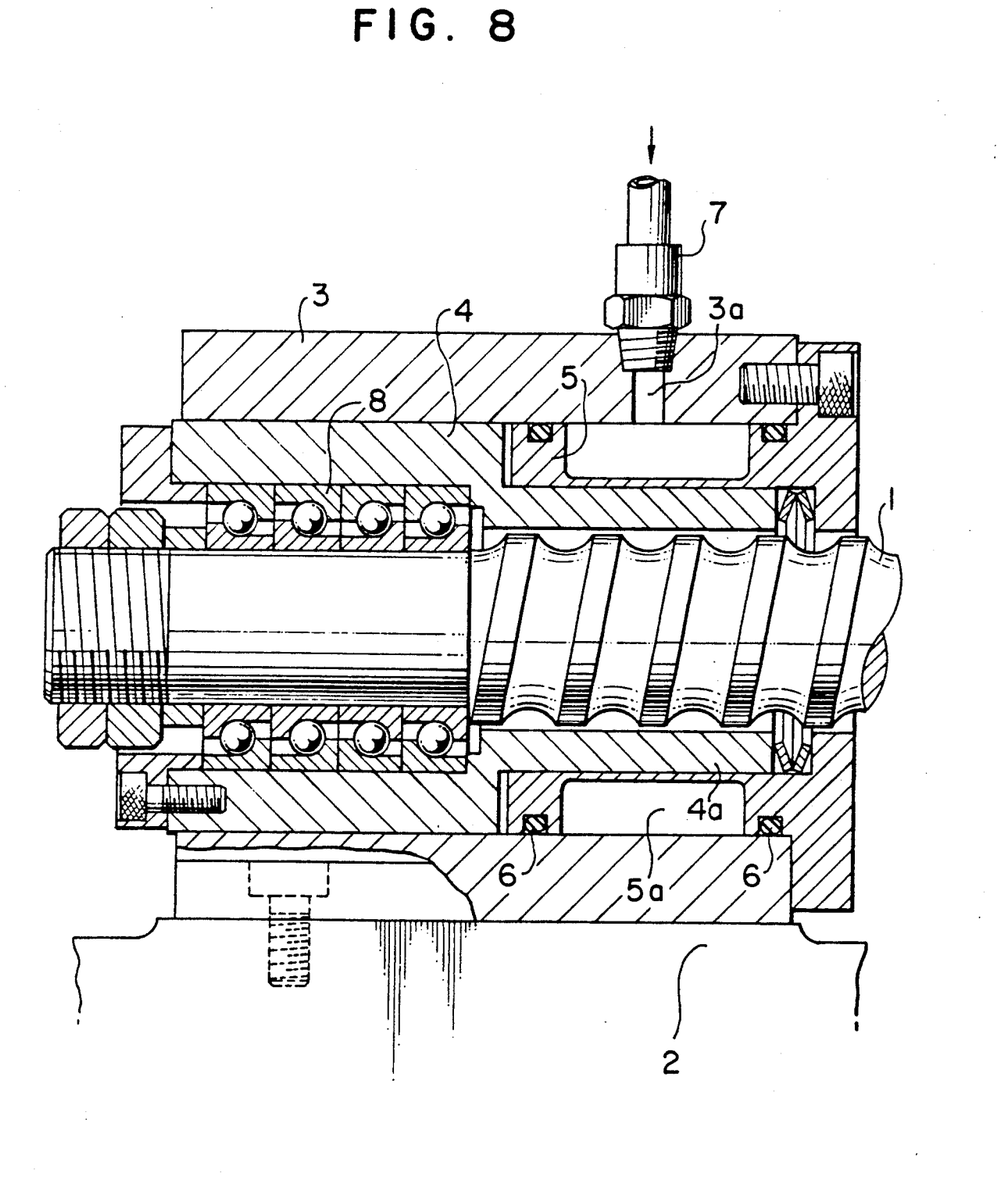
FIG. 8 is a sectional view showing a modification of the first embodiment.

FIG. 8 shows a modification of the first embodiment.

Figure 9:
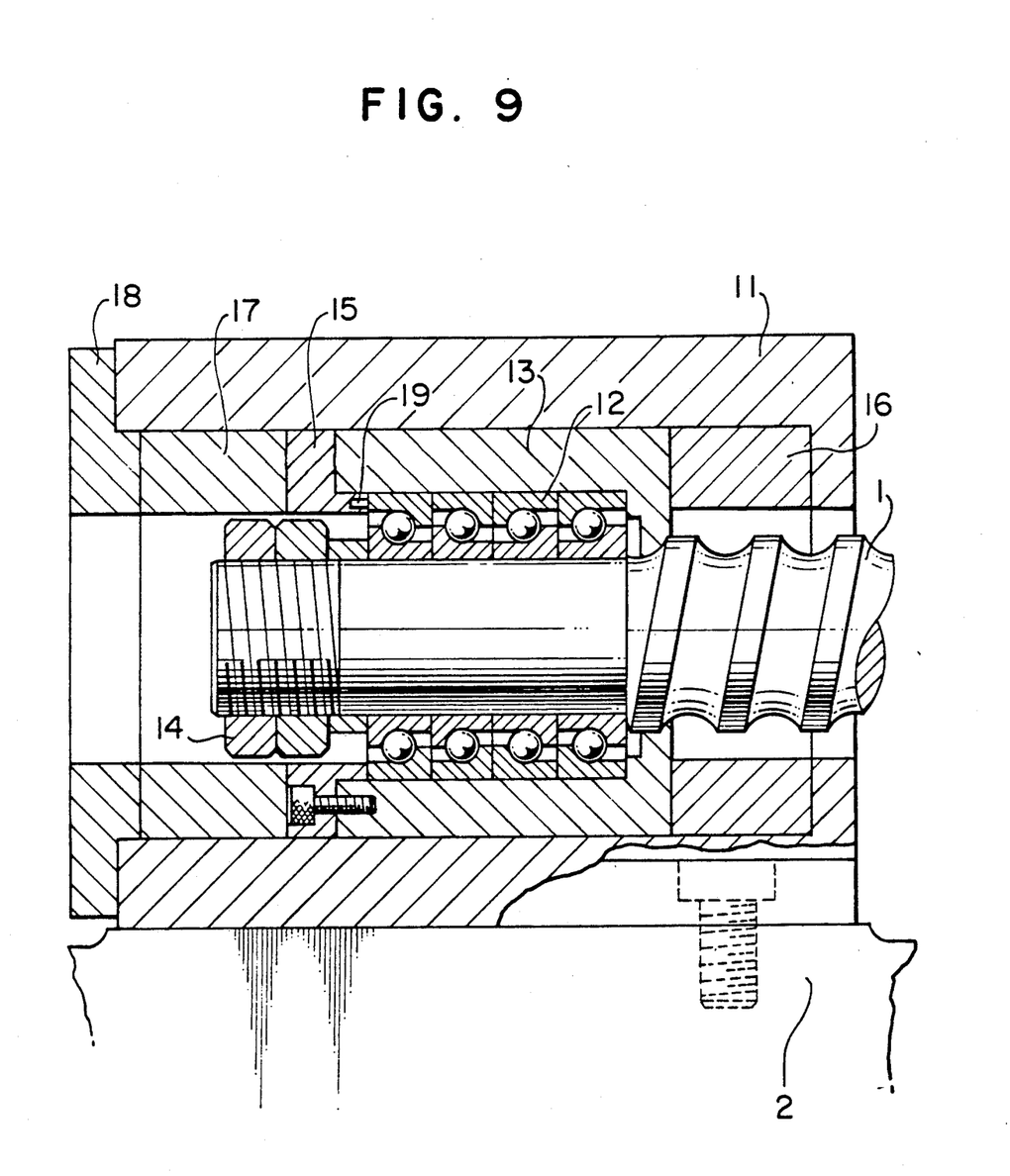
FIG. 9 is a sectional view showing the structure of a bearing section in accordance with a second embodiment of this invention.

The modification is arranged to add to the first embodiment a coned disk spring at the right end of the small diameter portion $4a$ of the bearing holder 4 in FIG. 8 so as to press it and, furthermore, provides the oil pressure expanding clamp tube with a bottom portion thereof so as to receive the coned disk spring at the right side of the spring. When the structure of the modification is in an unclamping state, the feed screw is pulled by the coned disk spring. Keeping the above condition in which the feed screw is pulled by the coned disk spring, the feed screw is clamped and operated to revolve. Due to a long time of operating heat generates in the feed screw and thus the feed screw is expanded with thermal expansion. The expansion in the feed screw, however, is absorbed so as to be set off against the previous tension A second embodiment of the invention will now be described with reference to FIG. 9. This embodiment includes a bearing bracket 11 which is fixed to the bed 2 at a position corresponding to the tip-end bearing of the feed screw 1. The bearing bracket 11 has a bottom portion in which a hole for passing the feed screw 1 is provided. A bearing case 13 containing angular bearings 12 for the feed screw is fitted into the hole of the bearing bracket 11 in such a manner as to be slidable in the axial direction. The inner rings of the angular bearings 12 are fixed by means of nuts 14 engaged with the male screw at the screw end, and the outer rings of the angular bearings 12 are fixed by means of an outer-ring-fixing cover 15. A compressive-force detector 19 is embedded in this outer-ring-fixing cover 15. Provided between the end surface of the bearing case 13 and the bottom of the bearing bracket 11 is a piezoelectric element 16. Another piezoelectric element 17 is provided between the outer-ring-fixing cover 15 and an outer cover 18, which is pressed against the piezoelectric element 17. It is known that these piezoelectric elements will be elongated in accordance with the voltage applied to them. In this example, the initial voltage is set at zero for the piezoelectric element 16, whereas the piezoelectric element 17 is elongated beforehand by applying the maximum voltage to it.

Figure 10:
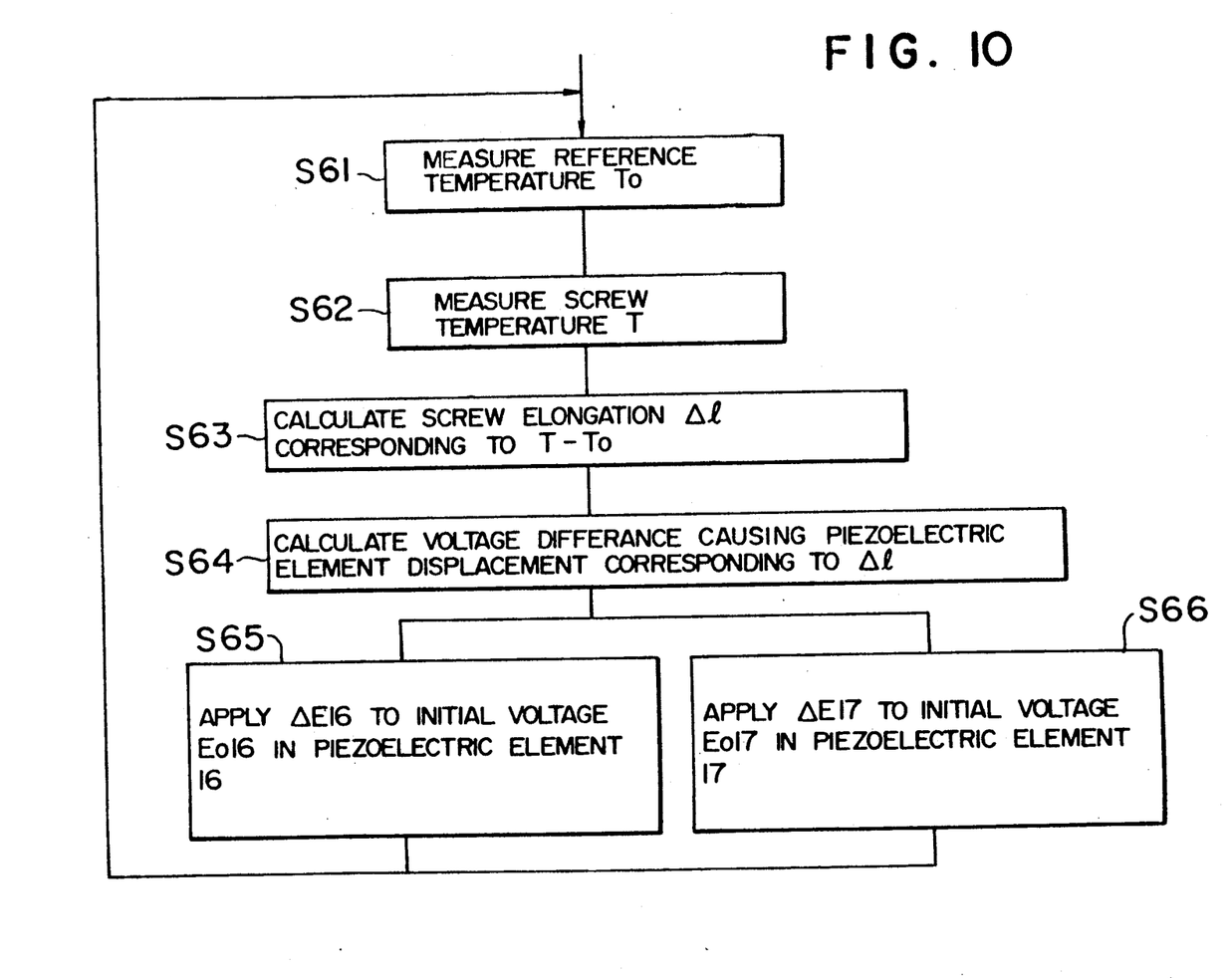
FIG. 10 is a flowchart of the control process for the second embodiment in which the screw-section temperature measured is utilized.

(1) The unclamping control in this embodiment can be conducted on the basis of the male-screw temperature measured. The control process will be described with reference to the flowchart of FIG. 10. In Step S61, the reference temperature $T_0$ is measured by means of a thermometer provided on the machine body, which is not affected by the temperature of the feed screw 1. In Step S62, the temperature T of the male screw is measured. In Step S63, the elongation of the screw $\Delta l$ corresponding to $T - T_0$ is calculated. In Step S64, the voltage $\Delta E$ causing a displacement of the piezoelectric element corresponding to Δl is calculated. In Step S65, a voltage obtained by adding the voltage ΔE16 of the piezoelectric element 16 corresponding to Δl to the initially applied voltage $E_0 16$ is applied to the piezoelectric element 16. Likewise, in Step S66, a voltage obtained by subtracting the voltage ΔE17 of the piezoelectric element 17 corresponding to Δl from the initially applied voltage $E_0 17$ is applied to the piezoelectric element 17. This step is repeated until the value of $T - T_0$ becomes constant.

Figure 11:
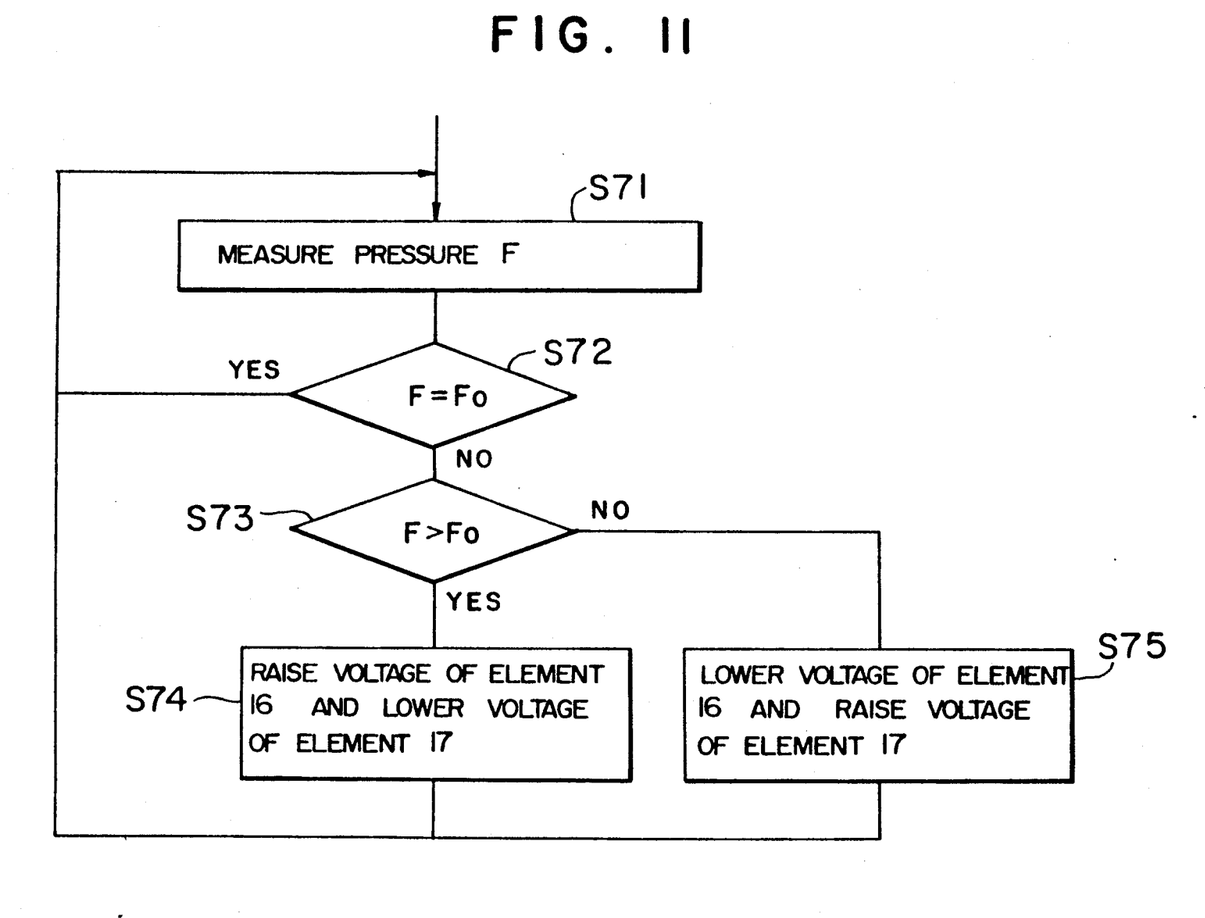
FIG. 11 is a flowchart of the control process for the same in which the compressive force measured is utilized.

(2) Control may also conducted on the basis of the compressive force of the bearing. The control process will be described with reference to the flowchart of FIG. 11. In Step S71, the compressive force F is measured by means of a compressive-force detector 19 shown in FIG. 9. In Step S72, a judgment is made as to whether or not the set compressive force $F_0$ is equal to the compressive force F measured. If the judgment result is YES, the procedure returns to Step S71, repeating the same step. If the result is NO, it is judged in Step S73 whether $F > F_0$. If the result is YES, the voltage of the piezoelectric element 16 is raised in Step S74, lowering the voltage of the piezoelectric element 17 such that the detected compressive pressure F is equal to the setting compressive pressure $F_0$. If the result is NO, the voltage of the piezoelectric element 16 is lowered in Step S75, raising the voltage of the piezoelectric element 17 such as the above. Afterwards, the procedure returns to Step S71, the same steps being repeated such that F is equal to $F_0$.

Having the above-described construction, the present invention provides the following advantages:

It is therefore possible to cope with the thermal expansion of the feed screw at low cost without deteriorating the rigidity of the feed system and without any cooling. The construction provides high reliability, allowing the machine to operate continuously and at high speed without involving any problem.

The present invention also allows fine and continuous control since it has nothing to do with the axial feed of the machine. Furthermore, it needs no high-pressure-oil source, nor does it involve any such maintenance problems as oil leakage, resulting in a still more simplified structure.

Figure 13:
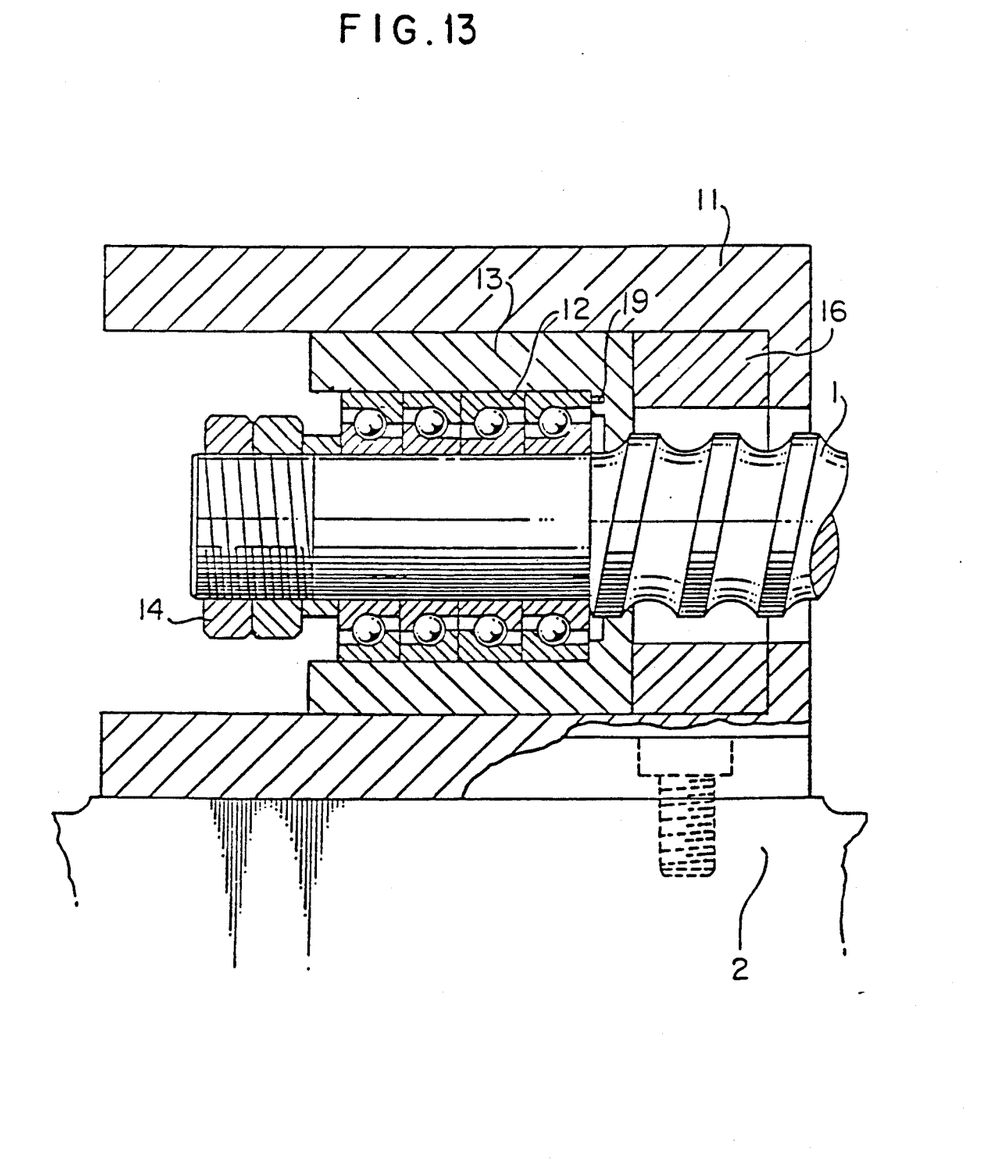
FIG. 13 is a section view showing the structure of a bearing section in accordance with a third embodiment of this invention.

Further, a third embodiment as shown in FIG. 13A is advantageous in that it requires only one piezoelectric element, resulting in a still more simplified control operation and low cost.

What is claimed is:

1. A feed-screw support structure of a type in which both ends of a feed screw may be fixed in an axial direction, comprising a main-body member; a bearing holding member at one end of the feed screw and arranged in the main-body member slidably in an axial direction; fixing means for fixing the slidable bearing holding member in the axial direction; and operating means for operating said fixing means with respect to factors related to heat generation in the feed screw, said operating means relieving the feed screw of being fixed to enable the feed screw to move in he axial direction when a predetermined amount of heat generation in the feed screw is reached.

2. A feed-screw support structure according to claim 1, wherein said fixing member is a clamping member provided between said bearing holder member and said main-body member and adapted to fix said bearing holder member and the main body member so as to prevent the bearing holder member from moving relatively against the main body member.

3. A feed-screw support structure according to claim 2, wherein said bearing holder member is normally kept in a released state, and wherein said clamping member is operated so as to set said bearing holder member in a stationary state.

4. A feed-screw support structure according to claim 1, wherein said main-body member has a bracket, said fixing member being piezoelectric elements, said bearing holding member being a bearing case at the one end of the feed screw and arranged between the piezoelectric elements, the feed-screw support structure further comprising means for measuring factors related to heat generation in the feed screw and for effecting adjustment of the bearing case in the axial direction by varying the voltage of said piezoelectric elements based on said measured factors.

5. A feed-screw support structure according to claim 1, further comprising a piezoelectric element provided only on an inner side of said main-body member, the piezoelectric element being applied initial voltage so as to provide the feed screw with pre-tension.

* * * * *